(12) United States Patent
Chu

(10) Patent No.: US 7,248,902 B2
(45) Date of Patent: Jul. 24, 2007

(54) MULTI-MODE POWER SUPPLY DEVICE OF WIRELESS EARPHONE

(76) Inventor: Yun Chu, 235 Chung-Ho Box 8-24, Taipei (TW)

( * ) Notice: Subject to any disclaimer, the term of this patent is extended or adjusted under 35 U.S.C. 154(b) by 564 days.

(21) Appl. No.: 10/770,607

(22) Filed: Feb. 3, 2004

(65) Prior Publication Data

US 2005/0170866 A1 Aug. 4, 2005

(51) Int. Cl.
*H04M 1/00* (2006.01)

(52) U.S. Cl. ............................... 455/569.1; 455/569.2; 455/572; 455/573; 455/575.1; 455/575.2; 379/420.01; 379/420.02; 379/425.02; 379/431; 379/433.08

(58) Field of Classification Search ............. 455/569.1, 455/569.2, 572, 573, 575.1, 575.2; 379/420.01–420.04, 379/428.02, 431, 433.08
See application file for complete search history.

(56) References Cited

U.S. PATENT DOCUMENTS

| | | | | |
|---|---|---|---|---|
| 6,230,029 B1 * | 5/2001 | Hahn et al. | ............... | 455/575.2 |
| 6,472,846 B1 * | 10/2002 | Hutchinson et al. | ........ | 320/114 |
| 6,839,448 B2 * | 1/2005 | Chen | ........................... | 381/370 |
| 6,868,284 B2 * | 3/2005 | Bae | ......................... | 455/575.2 |
| 7,046,799 B2 * | 5/2006 | Ma | ........................ | 379/433.13 |
| 2002/0016188 A1 * | 2/2002 | Kashiwamura | ............ | 455/568 |
| 2004/0204155 A1 * | 10/2004 | Nassimi | ................... | 455/569.1 |
| 2004/0264720 A1 * | 12/2004 | Huang et al. | ............... | 381/315 |

* cited by examiner

*Primary Examiner*—Matthew D. Anderson
*Assistant Examiner*—Sujatha Sharma

(57) ABSTRACT

A multi-mode power supply device of a wireless earphone is disclosed. The earphone is communicable bi-directionally with portable communication devices wirelessly through an antenna. The earphone has a battery set. In at least one side of the earphone; an internal of the earphone has a power management circuit. The battery set supplies power to the power management circuit. The power management circuit is used to control the power on or off. The communication devices are selected from portable mobile phones and vehicle used phones. A suspender is capable of being inserted into or buckled into the groove of the earphone so that the suspender is positioned at one side of the power supply module. The suspender has a power supply module. When the suspender is combined to the earphone. The power management circuit is electrically connected to the power supply module.

6 Claims, 5 Drawing Sheets

MULTI-MODE POWER SUPPLY DEVICE OF WIRELESS EARPHONE

FIELD OF THE INVENTION

The present invention relates to wireless earphones, and particularly to a multi-mode power supply device of a wireless earphone which has auxiliary power supplies.

BACKGROUND OF THE INVENTION

For those communicating and working by phones, an earphone is a necessary device so that they are unnecessary to hold the handset by one hand since this will make the workers feel inconveniently. In general, the earphone has a battery set as a power supply. However the working period of a battery set is not so long so as to satisfy the requirement of users. In general, the working time period of the battery set is about 2 to 3 hours. Furthermore, it must take time to charge the battery set with a time period. When the power of the battery set approaches to a used up period, the signals from the earphone will become weak and thus the user cannot hear the sound from the earphone clearly. Moreover, in charging the battery set of the earphone, the earphone is placed on a charger for a time period of at least 2 hours. In this time period, the earphone cannot be used. If the battery set is charged frequently, the lifetime of the battery set will reduce so that the earphone having the battery set will be deserted as the exhaustion of the battery set. Thus, in the prior art, the earphone is used as a consuming product, namely, the user must replace the earphone frequently for matching a coupled phone. Thereby the prior art is not only inconveniently, but also is uneconomic.

SUMMARY OF THE INVENTION

Accordingly, the primary object of the present invention is to provide a multi-mode power supply device of a wireless earphone; the earphone being communicable bi-directionally with portable communication devices wirelessly through an antenna; the earphone having a battery set; at least one side of the earphone; an internal of the earphone having a power management circuit; the battery set supplying power to the power management circuit; the power management circuit being used to control the power on or off. The communication devices are selected from portable mobile phones and vehicle used phones.

Furthermore, a suspender is capable of being inserted into or buckled into the groove of the earphone so that the suspender is positioned at one side of the power supply module; the suspender has a power supply module; when the suspender is combined to the earphone, the power management circuit is electrically connected to the power supply module.

In application, the suspender with the power supply module has a simple structure and a low cost. It likes a peripheral of a mobile phone. More than one suspender can be prepared. When one is exhausted, the others can be used so that the earphone is used continuously. The one updated is charged by a charger. Thereby the communication time is continuously with a high quality. The power management circuit is prepared with a check loop which serves to prevent power from flowing along a reverse direction so as to protect the components within the earphone.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
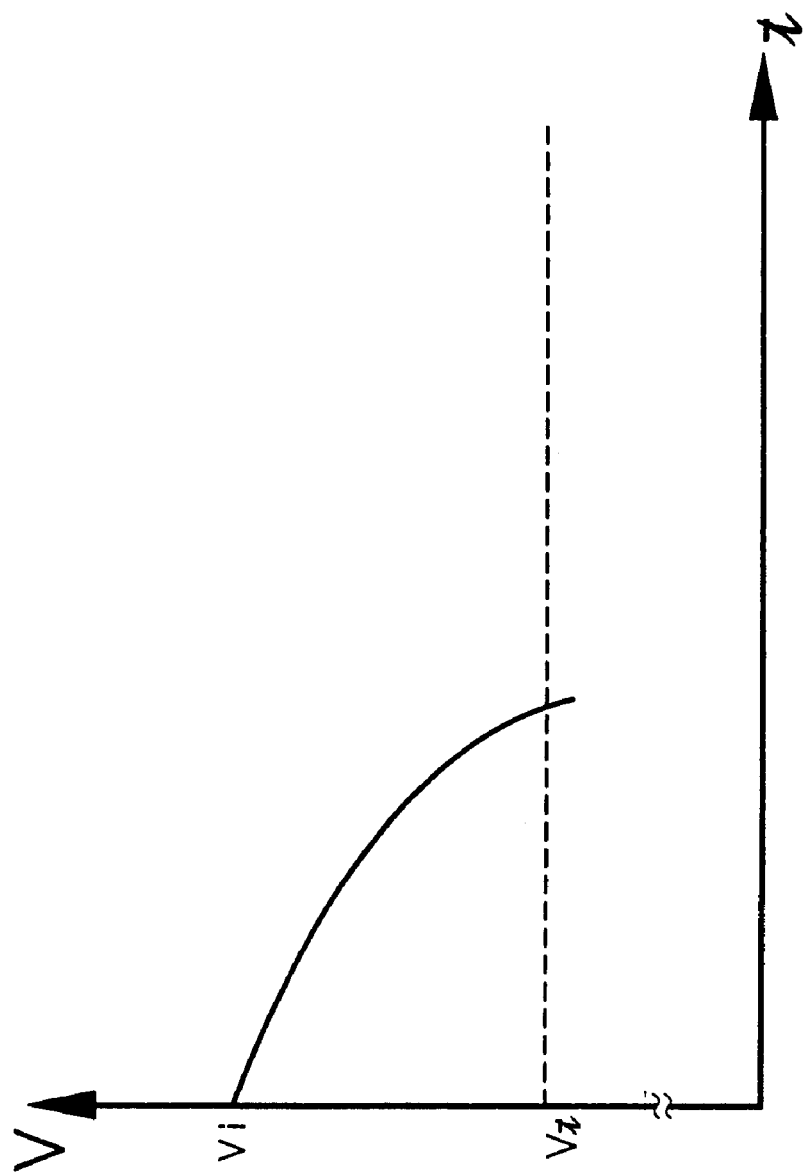
FIG. 1 is a schematic view showing the discharging curve of a battery set in the prior art.
Figure 2:
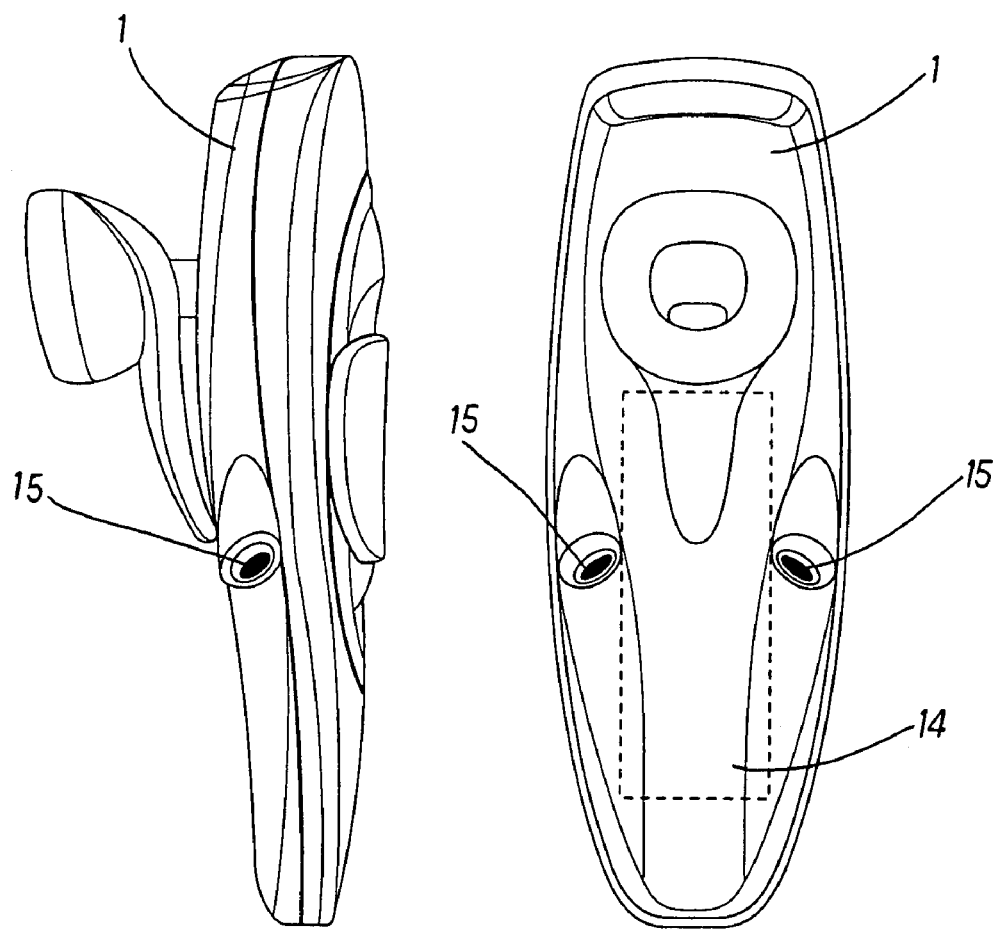
FIG. 2 shows a front view and a lateral view of the earphone according to the present invention.
Figure 3:
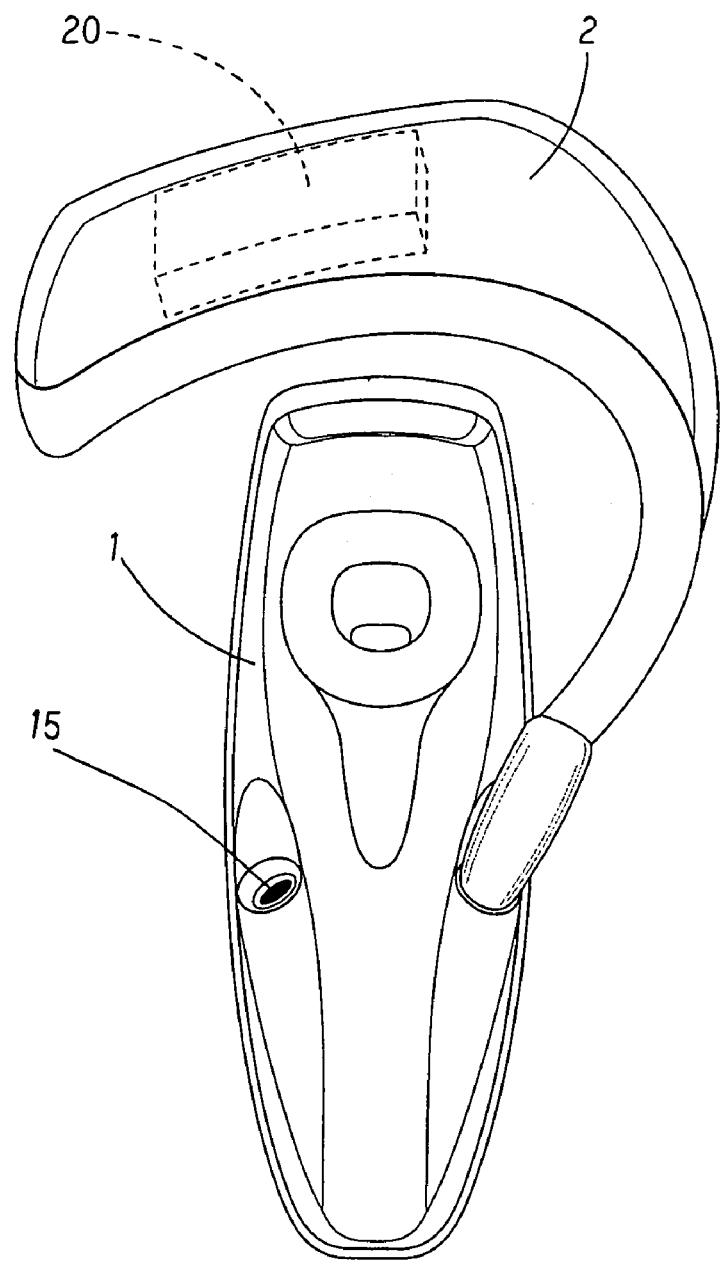
FIG. 3 is an assembled perspective view of the present invention.
Figure 4:
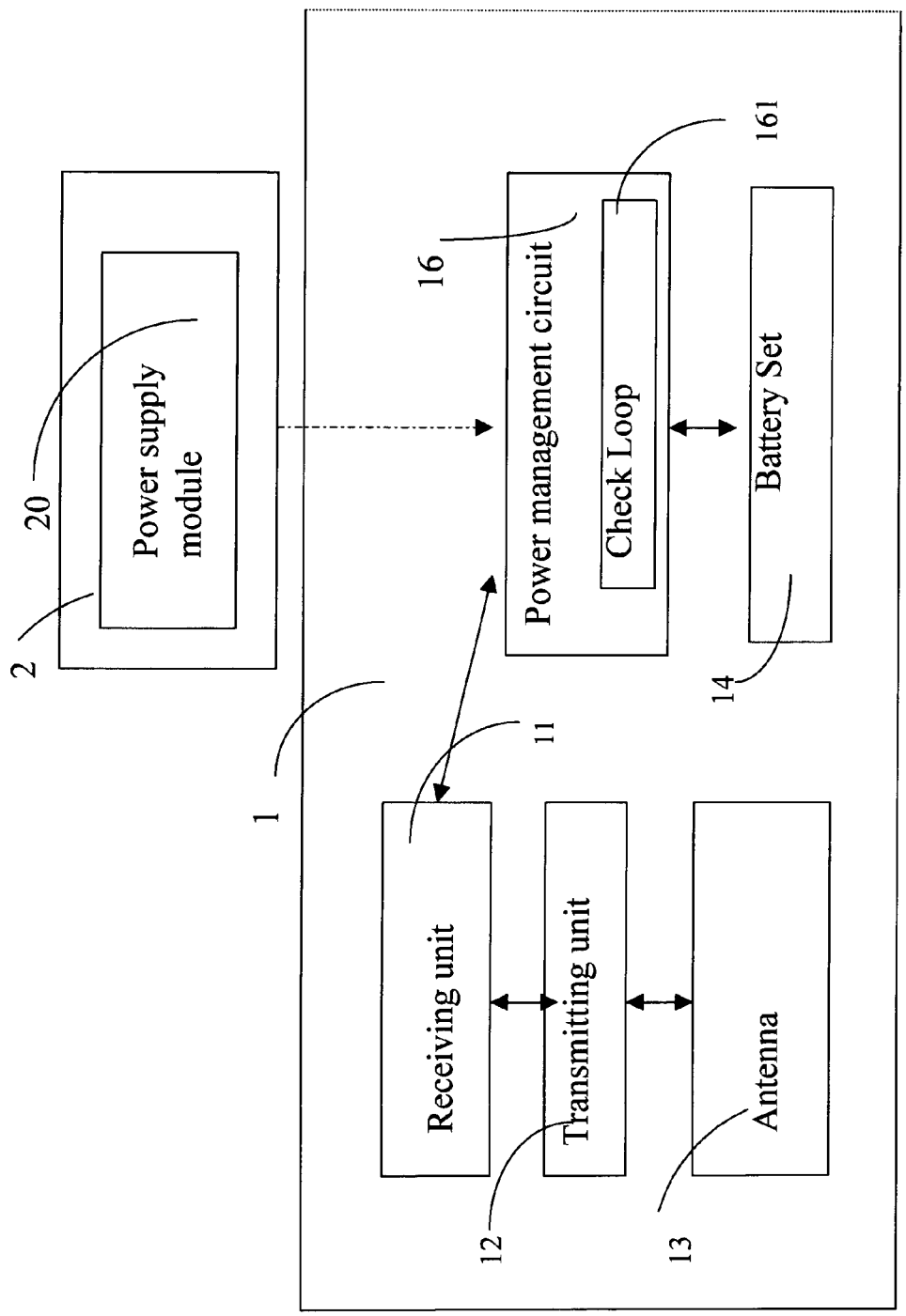
FIG. 4 shows the circuit block diagram of the present invention.

With reference to FIG. 2 to 4, the multi-mode power supply device of a wireless earphone of the present invention is illustrated. The earphone 1 has a receiving unit 11 and a transmitting unit 12. The earphone 1 is communicable bi-directionally with portable communication devices (not shown) wirelessly through an antenna 13. The earphone 1 has a preset battery set 14. At least one side of the earphone 1 has a groove 15. An internal of the groove 15 has a power management circuit 16. The battery set 14 supplies power to the power management circuit 16. The power management circuit 16 serves to control the power on or off.

A suspender 2 is capable of being inserted into or buckled into the groove 15 of the earphone 1 so that the suspender 2 is positioned at one side of the power supply module 20. The suspender 2 has a power supply module 20. It is preferably that the power supply module 20 is chargeable batteries. When the suspender 2 is combined to the earphone 1, the power management circuit 16 is electrically connected to the power supply module 20. Thereby, the battery set 14 and the power supply module 20 are integrated for supplying power to the earphone 1. Thus, the power supply to the earphone 1 is enlarged so that the communication and standby time of the earphone 1 are prolonged.

Figure 5:
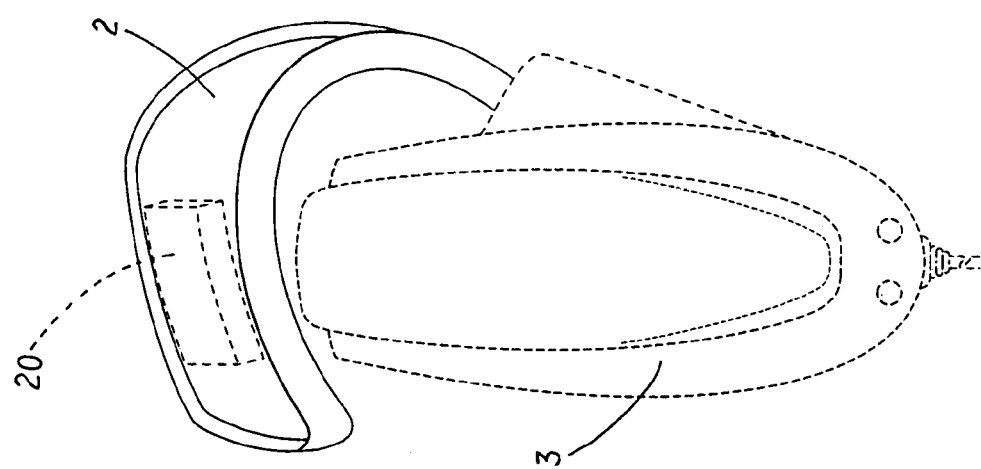
FIG. 5 shows an application of the present invention.
Figure 5:
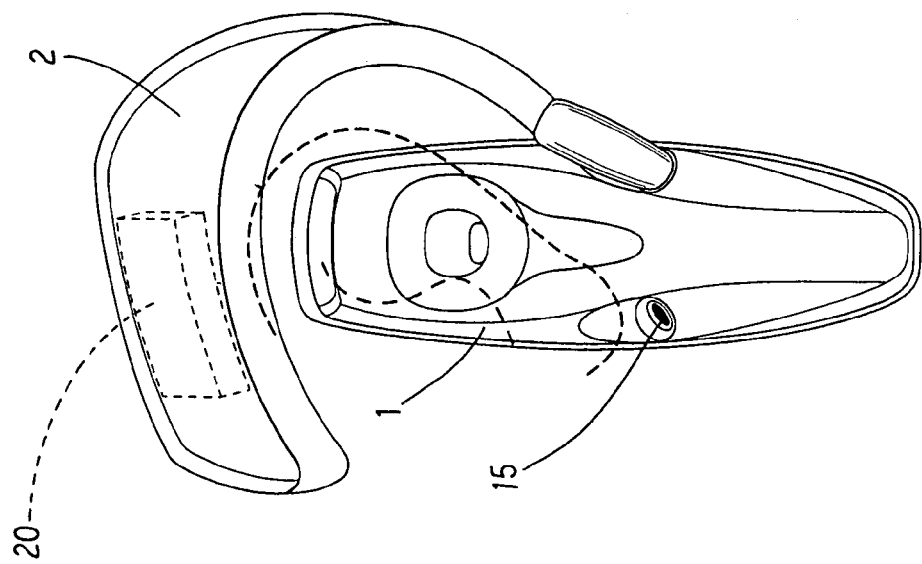

Furthermore, as shown in FIG. 5, in application, the suspender 2 with the power supply module 20 has a simple structure and a low cost. It likes a peripheral of a mobile phone. More than one suspender 2 can be prepared. When one is exhausted, the others can be used so that the earphone 1 is used continuously. The one updated is charged by a charger 3. Thereby the communication time is continuously with a high quality.

With reference to FIG. 4, the power management circuit 16 is prepared with a check loop 161 which serves to prevent power from flowing along a reverse direction so as to protect the components within the earphone 1.

In the present invention, the battery set may be a lithium battery set.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-mode power supply device of a wireless earphone; the earphone being communicable bi-directionally with portable communication devices wirelessly through an antenna; the earphone having a battery set in at least one side of the earphone; an internal of the earphone having a power management circuit; the battery set supplying power to the power management circuit; the power management circuit being used to control the power on or off; and wherein each of two sides of the earphone has a groove; the power supply module is installed in a suspender; one end of the suspender is inserted into one of the two grooves at two sides of the earphone so as to position the suspender to the earphone, the suspender having a power supply module; when the suspender is combined to the earphone, the power management circuit is electrically connected to the power supply module and because the power management circuit is also electrically connected to the battery set, power is supplied to the earphone.

2. The multi-mode power supply device of a wireless earphone as claimed in claim 1, wherein the communication devices are selected from portable mobile phones and vehicle used phones.

3. The multi-mode power supply device of a wireless earphone as claimed in claim 1, wherein the battery set is a lithium battery set; electric power is transferred from the battery set to the power management circuit for controlling the power output of the battery set.

4. The multi-mode power supply device of a wireless earphone as claimed in claim 3, wherein the power management circuit has a cheek loop for preventing power from flowing along a reverse direction so as to protect the components within the earphone.

5. The multi-mode power supply device of a wireless earphone as claimed in claim 1, wherein the power supply module is a chargeable battery.

6. The multi-mode power supply device of a wireless earphone as claimed in claim 1, wherein the power management circuit has a check loop for preventing power from flowing along a reverse direction so as to protect the components within the earphone.

* * * * *